Patented July 6, 1926.

1,591,270

UNITED STATES PATENT OFFICE.

HENRY BLUMENBERG, JR., OF LOS ANGELES, CALIFORNIA, ASSIGNOR TO STOCKHOLDERS SYNDICATE, OF LOS ANGELES, CALIFORNIA, A CORPORATION OF CALIFORNIA.

PROCESS OF MAKING FERTILIZER.

No Drawing. Application filed May 12, 1925. Serial No. 29,844.

My invention relates to a process of making a fertilizer, and has for its object to provide a simple, efficient and economic process whereby a fertilizer material rich in phosphates and nitrates is produced.

My invention consists in the steps of the process hereinafter described and claimed.

I take crude phosphate rock $Ca_3(PO_4)_2$ and calcium nitrate and mix the same in the presence of water and charge the mixture with sulphur dioxide, which produces calcium sulphite and nitric acid, which in turn will attack crude phosphate rock and produce calcium nitrate and phosphoric acid. The phosphoric acid will again react on the crude phosphate rock and produce acid calcium phosphate in accordance with the following equations:

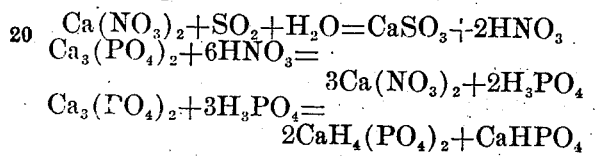

The mixture is evaporated to dryness and forms a hygroscopic mass due to the presence of the calcium nitrate and calcium phosphates. Sufficient amount of powdered quick lime, CaO, is added to the mixture to form a dry powder, which forms an excellent fertilizing material.

This process reaches an efficiency of 95% of converting the crude phosphate rock to calcium nitrate and calcium phosphates.

If desired the insoluble matter composed of impurities of the phosphate rock may be filtered off.

In place of the calcium nitrate the nitrates of the alkali metals may be used, such as sodium nitrate or potassium nitrate or any other metal nitrates. The resulting product will then contain in place of the calcium nitrate the corresponding alkali metal nitrates and other metal nitrates respectively.

Various changes may be made in the steps of the process by those skilled in the art without departing from the spirit of my invention, as claimed.

I claim:

1. A process of making a fertilizer comprising mixing finely ground phosphate rock with calcium nitrate in the presence of water and charging the mixture with sulphur dioxide thereby producing fertilizing material containing calcium nitrate and large percentages of soluble calcium phosphates, evaporating to dryness and adding powdered quick lime to make a dry powder.

2. A process of making a fertilizer comprising mixing finely ground phosphate rock with calcium nitrate in the presence of water and charging the mixture with sulphur dioxide thereby producing fertilizing material containing calcium nitrate and large percentages of soluble calcium phosphates and evaporating to dryness.

3. A process of making a fertilizer comprising mixing finely ground phosphate rock with a metal nitrate in the presence of water and charging the mixture with sulphur dioxide, thereby producing fertilizing material containing the metal nitrates and large percentages of soluble calcium phosphates and evaporating to dryness.

In testimony whereof I have signed my name to this specification.

HENRY BLUMENBERG, Jr.